(12) United States Patent
Monroe et al.

(10) Patent No.: US 10,155,892 B2
(45) Date of Patent: Dec. 18, 2018

(54) ABRASIVE PARTICLES, ABRASIVE ARTICLES, AND METHODS OF MAKING AND USING THE SAME

(71) Applicant: 3M INNOVATIVE PROPERTIES COMPANY, St. Paul, MN (US)

(72) Inventors: Larry D. Monroe, Maplewood, MN (US); Grant E. Greske, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 106 days.

(21) Appl. No.: 15/121,968

(22) PCT Filed: Feb. 13, 2015

(86) PCT No.: PCT/US2015/015797
§ 371 (c)(1),
(2) Date: Aug. 26, 2016

(87) PCT Pub. No.: WO2015/130487
PCT Pub. Date: Sep. 3, 2015

(65) Prior Publication Data
US 2017/0107412 A1 Apr. 20, 2017

Related U.S. Application Data

(60) Provisional application No. 61/945,609, filed on Feb. 27, 2014.

(51) Int. Cl.
C09K 3/14 (2006.01)
B24D 11/00 (2006.01)
(Continued)

(52) U.S. Cl.
CPC ............ *C09K 3/1436* (2013.01); *B24D 11/00* (2013.01); *B24D 11/02* (2013.01); *C04B 35/10* (2013.01);
(Continued)

(58) Field of Classification Search
None
See application file for complete search history.

(56) References Cited

U.S. PATENT DOCUMENTS

| 1,910,440 A | 5/1933 | Lilienfeld |
| 2,127,504 A | 8/1938 | Derr |

(Continued)

FOREIGN PATENT DOCUMENTS

| CA | 2110961 | 6/1994 |
| CN | 1134692 A | 10/1996 |

(Continued)

OTHER PUBLICATIONS

Bruce, Solid State Electrochemistry, 26-29 (1995).
(Continued)

*Primary Examiner* — Colleen P Dunn
*Assistant Examiner* — Ross J Christie
(74) *Attorney, Agent, or Firm* — Bradford B. Wright

(57) ABSTRACT

Abrasive particles include: 0.50 to 5.00 weight percent of seed particles for alpha-alumina formation selected from the group consisting of alpha-$Fe_2O_3$ seed particles, alpha-$Al_2O_3$ seed particles, and combinations thereof; 0.50 to 5.00 weight percent of MgO; 0.02 to 0.40 weight percent of $Li_2O$ or a molar equivalent amount of at least one alkali metal oxide selected from the group consisting of: $Na_2O$; $K_2O$; combinations of $Na_2O$ and $Li_2O$; combinations of $K_2O$ and $Li_2O$; combinations of $Na_2O$ and $K_2O$; and combinations of $Li_2O$, $Na_2O$, and $K_2O$; and 91.08 to 99.48 weight percent of $Al_2O_3$.

(Continued)

Methods of making the abrasive particles and abrasive articles incorporating them are also disclosed.

16 Claims, 1 Drawing Sheet

(51) Int. Cl.
*B24D 11/02* (2006.01)
*C04B 35/10* (2006.01)
*C04B 35/64* (2006.01)
*C04B 35/111* (2006.01)
*C04B 35/626* (2006.01)

(52) U.S. Cl.
CPC .... *C04B 35/1115* (2013.01); *C04B 35/62655* (2013.01); *C04B 35/64* (2013.01); *C09K 3/1409* (2013.01); *C09K 3/1445* (2013.01); *C04B 2235/3201* (2013.01); *C04B 2235/322* (2013.01); *C04B 2235/3203* (2013.01); *C04B 2235/3206* (2013.01); *C04B 2235/3218* (2013.01); *C04B 2235/3272* (2013.01); *C04B 2235/443* (2013.01); *C04B 2235/5296* (2013.01); *C04B 2235/5409* (2013.01); *C04B 2235/5454* (2013.01); *C04B 2235/77* (2013.01); *C04B 2235/80* (2013.01); *C04B 2235/96* (2013.01)

(56) References Cited

U.S. PATENT DOCUMENTS

| | | |
|---|---|---|
| 2,958,593 A | 11/1960 | Hoover |
| 3,041,156 A | 6/1962 | Rowse |
| 3,340,205 A | 9/1967 | Hayes |
| 3,957,598 A | 5/1976 | Merkl |
| 4,227,350 A | 10/1980 | Fitzer |
| 4,314,827 A | 2/1982 | Leitheiser |
| 4,518,397 A | 5/1985 | Leitheiser |
| 4,543,107 A | 9/1985 | Rue |
| 4,588,419 A | 5/1986 | Caul |
| 4,734,104 A | 3/1988 | Broberg |
| 4,737,163 A | 4/1988 | Larkey |
| 4,741,743 A | 5/1988 | Narayanan |
| 4,744,802 A | 5/1988 | Schwabel |
| 4,751,138 A | 6/1988 | Tumey |
| 4,770,671 A | 9/1988 | Monroe |
| 4,800,685 A | 1/1989 | Haynes, Jr. |
| 4,842,757 A | 6/1989 | Reboa |
| 4,848,041 A | 7/1989 | Kruschke |
| 4,881,951 A | 11/1989 | Wood |
| 4,898,597 A | 2/1990 | Hay |
| 4,991,362 A | 2/1991 | Heyer |
| 4,997,461 A | 3/1991 | Markhoff-Matheny |
| 5,009,675 A | 4/1991 | Kunz |
| 5,011,508 A | 4/1991 | Wald |
| 5,037,453 A | 8/1991 | Narayanan |
| 5,042,991 A | 8/1991 | Kunz |
| 5,139,978 A | 8/1992 | Wood |
| 5,152,917 A | 10/1992 | Pieper |
| 5,164,348 A | 11/1992 | Wood |
| 5,190,567 A | 3/1993 | Tamamaki |
| 5,201,916 A | 4/1993 | Berg |
| 5,203,884 A | 4/1993 | Buchanan |
| 5,213,591 A | 5/1993 | Celikkaya |
| 5,219,806 A | 6/1993 | Wood |
| 5,312,789 A * | 5/1994 | Wood ............... C01F 7/02 51/309 |
| 5,378,251 A | 1/1995 | Culler |
| 5,429,647 A | 7/1995 | Larmie |
| 5,436,063 A | 7/1995 | Follett |
| 5,443,906 A | 8/1995 | Pihl |
| 5,496,386 A | 3/1996 | Broberg |
| 5,498,269 A | 3/1996 | Larmie |
| 5,520,711 A | 5/1996 | Helmin |
| 5,551,963 A | 9/1996 | Larmie |
| 5,591,239 A | 1/1997 | Larson |
| 5,593,468 A | 1/1997 | Khaund |
| 5,593,647 A | 1/1997 | Kirby |
| 5,609,706 A | 3/1997 | Benedict |
| 5,679,067 A | 10/1997 | Johnson |
| 5,681,361 A | 10/1997 | Sanders, Jr. |
| 5,712,210 A | 1/1998 | Windisch |
| 5,779,743 A * | 7/1998 | Wood ............... B24D 3/00 51/309 |
| 5,858,140 A | 1/1999 | Berger |
| 5,863,308 A | 1/1999 | Qi |
| 5,893,935 A * | 4/1999 | Wood ............... C09K 3/1409 51/309 |
| 5,903,951 A | 5/1999 | Ionta |
| 5,908,478 A | 6/1999 | Wood |
| 5,928,070 A | 7/1999 | Lux |
| 5,961,674 A | 10/1999 | Gagliardi |
| 5,975,988 A | 11/1999 | Christianson |
| 6,017,831 A | 1/2000 | Beardsley |
| 6,053,956 A * | 4/2000 | Wood ............... C01F 7/023 51/309 |
| 6,054,093 A | 4/2000 | Torre, Jr. |
| 6,206,942 B1 * | 3/2001 | Wood ............... B24D 3/00 51/309 |
| 6,287,353 B1 | 9/2001 | Celikkaya |
| 6,706,083 B1 | 3/2004 | Rosenflanz |
| 6,802,878 B1 * | 10/2004 | Monroe ............... B24D 18/00 51/309 |
| 8,034,137 B2 | 10/2011 | Erickson |
| 8,123,828 B2 | 2/2012 | Culler |
| 8,142,531 B2 | 3/2012 | Adefris |
| 8,142,532 B2 | 3/2012 | Erickson |
| 8,142,891 B2 | 3/2012 | Culler |
| 2006/0196123 A1 | 9/2006 | Marlin |
| 2008/0148653 A1 | 6/2008 | Bauer |
| 2009/0165394 A1 | 7/2009 | Culler |
| 2010/0146867 A1 | 6/2010 | Boden |
| 2010/0151195 A1 | 6/2010 | Culler |
| 2010/0151196 A1 | 6/2010 | Adefris |
| 2010/0151201 A1 | 6/2010 | Erickson |

FOREIGN PATENT DOCUMENTS

| | | |
|---|---|---|
| CN | 102639296 A | 8/2012 |
| CN | 102666018 A | 9/2012 |
| CN | 102807240 A | 12/2012 |
| CN | 103998561 A | 8/2014 |
| GB | 1193258 | 5/1970 |
| GB | 2099012 | 12/1981 |
| IN | 220401 | 5/2008 |
| WO | WO 95/13251 A1 | 5/1995 |
| WO | WO 97/00836 | 1/1997 |
| WO | WO 2011-109188 | 9/2011 |
| WO | WO 2013/102173 A1 | 7/2013 |
| WO | WO 2013-188038 | 12/2013 |

OTHER PUBLICATIONS

International Search Report for PCT International Application No. PCT/US2015/015797 dated Apr. 24, 2015, 5 pages.
Extended European Search Report, EP15756094.7, dated Sep. 6, 2017, 3 pages.

* cited by examiner

ABRASIVE PARTICLES, ABRASIVE ARTICLES, AND METHODS OF MAKING AND USING THE SAME

TECHNICAL FIELD

The present disclosure relates to abrasive particles and methods of making the same. The abrasive particles can be incorporated into a variety of abrasive articles, including bonded abrasives, coated abrasives, nonwoven abrasives, and abrasive brushes.

BACKGROUND

Alpha-alumina is widely used as an abrasive material in the abrasives industry. It may be used in a pure form, or more preferably in a form containing additives that enhance its abrasive properties. Many commercially important alpha-alumina abrasive particles are derived from a sol-gel precursor. They are made by preparing a dispersion (e.g., a sol) comprising water, an alpha-alumina precursor such as, e.g., alumina monohydrate (boehmite), and optionally peptizing agent (e.g., an acid such as nitric acid), then gelling the dispersion, drying the gelled dispersion, crushing the dried dispersion into particles, calcining the particles to remove volatiles, and sintering the calcined particles at a temperature below the melting point of alpha-alumina. Frequently, the dispersion also includes one or more oxide modifiers (e.g., rare earth oxides (REOs), $Cr_2O_3$, CoO, $Fe_2O_3$, $Li_2O$, MgO, MnO, $Na_2O$, NiO, $SiO_2$, $SnO_2$, $TiO_2$, ZnO, and $ZrO_2$), seed particles (e.g., alpha-alumina seed particles and alpha-$Fe_2O_3$ seed particles) and/or precursors thereof. Such additions are typically made to alter or otherwise modify the physical properties and/or microstructure of the sintered abrasive particles. In addition, or alternatively, such oxide modifiers, nucleating agents, and/or precursors thereof may be impregnated into the dried or calcined material (typically calcined particles). Among the most useful of the oxide modifiers are REOs such as, for example, lanthanum oxide, neodymium oxide, yttrium oxide, cerium oxide, europium oxide, hafnium oxide, erbium oxide, samarium oxide, ytterbium oxide, gadolinium oxide, and praseodymium oxide. For example, REO modifiers are commonly used in sol-gel alumina abrasives for use in abrading stainless steel. In recent years, the availability of REOs has become a major problem for all industries, limiting supply and driving up costs.

Sol-gel-derived alpha-alumina-based sintered abrasive particles have been used in a wide variety of abrasive products (e.g., bonded abrasives, coated abrasives, and abrasive brushes) and abrading applications, including both low and high pressure grinding applications.

SUMMARY

In one aspect, the present disclosure provides abrasive particles, wherein the abrasive particles comprise the components:
a) 0.50 to 5.00 weight percent of seed particles for alpha-alumina formation selected from the group consisting of alpha-$Fe_2O_3$ seed particles, alpha-$Al_2O_3$ seed particles, and combinations thereof;
b) 0.50 to 5.00 weight percent of MgO;
c) 0.02 to 0.40 weight percent of $Li_2O$ or a molar equivalent amount of at least one alkali metal oxide selected from the group consisting of: $Na_2O$; $K_2O$; combinations of $Na_2O$ and $Li_2O$; combinations of $K_2O$ and $Li_2O$; combinations of $Na_2O$ and $K_2O$; and combinations of $Li_2O$, $Na_2O$, and $K_2O$; and
d) 91.08 to 99.48 weight percent of $Al_2O_3$.

In another aspect, the present disclosure provides a method of abrading a workpiece, the method comprising:
frictionally contacting abrasive particles according to the present disclosure with a surface of the workpiece, and
moving at least one of the abrasive particles and the surface of the workpiece relative to the other to abrade at least a portion of the surface of the workpiece.

In yet another aspect, the present disclosure provides an abrasive article according to the present disclosure, wherein the binder material is disposed on a substrate.

In yet another aspect, the present disclosure provides a method of making abrasive particles, the method comprising:
i) providing a dispersion comprising:
  an alpha-alumina precursor;
  alkali metal cations selected from the group consisting of $Li^+$, $Na^+$, $K^+$, and combinations thereof;
  magnesium oxide or a precursor thereof; and
  seed particles selected from the group consisting of alpha-$Fe_2O_3$ seed particles and alpha-$Al_2O_3$ seed particles, or a precursor thereof, wherein the seed particles facilitate conversion of the alumina precursor material to alpha-alumina upon sintering;
ii) converting the dispersion to abrasive precursor particles; and
iii) sintering the abrasive precursor particles to provide the abrasive particles, wherein the abrasive particles comprise the components:
  a) 0.50 to 5.00 weight percent of the seed particles;
  b) 0.50 to 5.00 weight percent of MgO;
  c) 0.02 to 0.40 weight percent of $Li_2O$ or a molar equivalent amount of at least one alkali metal oxide selected from the group consisting of: $Na_2O$; $K_2O$; combinations of $Na_2O$ and $Li_2O$; combinations of $K_2O$ and $Li_2O$; combinations of $Na_2O$ and $K_2O$; and combinations of $Li_2O$, $Na_2O$, and $K_2O$; and
  d) 91.08 to 99.48 weight percent of $Al_2O_3$.

Advantageously, and quite unexpectedly, abrasive particles according to the present disclosure generally exhibit one or more superior abrasive performance properties as compared to conventional alpha-alumina abrasive particles. They may even exhibit one or more abrasive performance properties that is/are equivalent to, or even superior to, commercially alpha-alumina abrasive particles containing expensive and difficult to obtain rare earth oxides, which are typically among the best-performing alumina-based abrasives, for example, for grinding stainless steel.

Further, while the benefits are pronounced in the case of seeded alpha-alumina-based particles, a negligible or contrary effect is seen with non-seeded alpha-alumina-based abrasive particles of comparable composition.

Features and advantages of the present disclosure will be further understood upon consideration of the detailed description as well as the appended claims.

Figure 1:
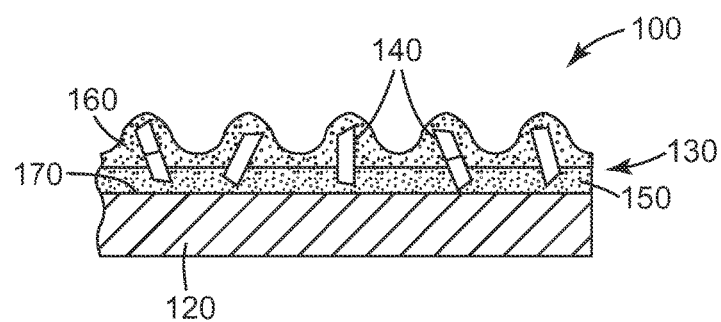
FIG. 1 is a schematic cross-sectional view of an exemplary coated abrasive article including abrasive particles according to the present disclosure.

While the above-identified drawing figures set forth several embodiments of the present disclosure, other embodiments are also contemplated; for example, as noted in the discussion. In all cases, the disclosure is presented by way of representation and not limitation. It should be understood that numerous other modifications and embodiments can be devised by those skilled in the art, which fall within the scope and spirit of the principles of the disclosure. The figures may not be drawn to scale. Like reference numbers may have been used throughout the figures to denote like parts.

DETAILED DESCRIPTION

Abrasive particles according to the present disclosure can be made by a process that starts with an initial dispersion comprising one or more alpha-alumina precursors (i.e., materials that after drying, optionally calcining, and sintering form alpha-alumina) dispersed in a dispersing medium. As used herein, the term "dispersion" refers to a system, for example, such as a colloid or sol, consisting of a disperse phase in a dispersing medium. The dispersing medium is a liquid, typically water, although organic solvents, such as lower alcohols (typically $C_1$-$C_6$ alcohols), hexane, or heptane, may also be useful as the liquid medium. The water may be, for example, tap water, distilled water, or deionized water.

Examples of suitable alpha-alumina precursors include, for example, boehmite Boehmite sols are commercially available, for example, as DISPERAL from Sasol Limited, Johannesburg, South Africa; as DISPAL 23N480 and CATAPAL D from Sasol North America, Houston, Tex.; and under the trade designation HiQ (e.g., HiQ-10, HiQ-20, HiQ-30, and HiQ-40) from BASF, Catalysts Division, Iselin, N.J. These boehmites or alumina monohydrates are in the alpha-form, and include relatively little, if any, hydrated phases other than monohydrates).

Examples of other alpha-alumina sources and precursors include basic aluminum carboxylates (e.g., aluminum formoacetate, aluminum nitroformoacetate), partially hydrolyzed aluminum alkoxides, hydrated aluminas, aluminum complexes, and aluminum salts (e.g., basic aluminum nitrates), and combinations thereof. In the case of the basic aluminum carboxylates, these are of the general formula $Al(OH)_y(carboxylate)_{3-y}$, where y is between 1 and 2, in some embodiments between 1 and 1.5, and the carboxylate counterion is selected from the group consisting of formate, acetate, propionate, and oxalate or combinations of these carboxylates. These materials can be prepared, for example, by digesting aluminum metal in a solution of the carboxylic acid as described in U.S. Pat. No. 3,957,598 (Merkl). Basic aluminum nitrates can also be prepared, for example, by digesting aluminum metal in a nitric acid solution as described in U.S. Pat. No. 3,340,205 (Hayes et al.), or Great Britain Pat. No. 1,193,258 (Fletcher et al.), or by the thermal decomposition of aluminum nitrate as described in U.S. Pat. No. 2,127,504 (Derr et al.). These materials can also be prepared, for example, by partially neutralizing an aluminum salt with a base. The basic aluminum nitrates have the general formula $Al(OH)_z(NO_3)_{3-z}$, where z is between about 0.5 to about 2.5.

Optionally, and typically, the dispersion is treated with a peptizing agent. Suitable peptizing agents are generally soluble ionic compounds which are believed to cause the surface of a particle or colloid to be uniformly charged in a liquid medium (e.g., water). In some embodiments, the peptizing agents are acids or acid compounds. Examples of typical acids include monoprotic acids and acid compounds, such as acetic, hydrochloric, formic, and nitric acid, with nitric acid being preferred. The amount of acid used depends, for example, on the dispersibility of the particulate alumina source, the percent solids of the dispersion, the components of the dispersion, the amounts, or relative amounts of the components of the dispersion, the particle sizes of the components of the dispersion, and/or the particle size distribution of the components of the dispersion. The dispersion typically contains at least, 0.1 to 20 percent by weight of acid, and in some embodiments 1 to 10 percent by weight of acid, or even 3 to 8 percent by weight of acid, based on the weight of alumina source (e.g., boehmite and/or an-alumina precursor) in the dispersion.

Suitable peptizing agents are generally soluble ionic compounds, which are believed to cause the surface of a particle or colloid to be uniformly charged in a liquid medium (e.g., water). In some embodiments, the peptizing agents are acids or acid compounds. Examples of typical acids include monoprotic acids and acid compounds, such as acetic, hydrochloric, formic, and nitric acid, with nitric acid being preferred. The amount of acid used typically will depend, for example, on the dispersibility of a particulate alumina source, the percent solids of the dispersion, the components of the dispersion, the amounts, or relative amounts of the components of the dispersion, the particle sizes of the components of the dispersion, and/or the particle size distribution of the components of the dispersion. The dispersion typically contains at least, 0.1 to 20 percent, and in some embodiments 1 to 10 percent by weight acid, or even 3 to 8 percent by weight acid, based on the weight of the alumina source in the dispersion. In some embodiments, the acid may be applied to the surface of boehmite particles prior to being combined with the water. The acid surface treatment may provide improved dispersibility of the boehmite in the water.

The initial dispersion is seeded or nucleated by an appropriate seed particle (also called a nucleating agent) such as alpha-alumina seed particles or iron oxide seed particles (e.g., alpha-iron oxide) and precursors thereof) that serves to modify grain size of the alpha-alumina crystalline phase. Seed particles, are preferably of a small size (e.g., less than 5 microns, preferably less than 1 micron, and more preferably less than 0.2 micron). The addition of seed particles results, after sintering, in smaller alpha-alumina crystallites or cells in the resulting abrasive particles, producing a more durable abrasive grain.

Magnesium, lithium, sodium, and/or potassium may be present in other ingredients of the initial dispersion, and/or they may be added separately. For example, they may be added as nitrate salts or acetate salts (or some other soluble salt) and/or less preferably as their oxide or hydroxide forms.

The amount of seed particles for alpha-alumina formation and their precursors are adjusted such that the resultant abrasive particles have 0.50 to 5.00 weight percent of the seed particles, preferably 1.00 to 5.00 weight percent, and more preferably 1.00 to 3.00 weight percent.

The levels of magnesium are adjusted such that the resultant abrasive particles have 0.50 to 5.00 weight percent of magnesium as MgO (i.e., on a theoretical oxide basis where all magnesium is present as MgO), preferably 1.00 to 3.00 weight percent, and more preferably 1.50 to 2.50 weight percent.

The levels of lithium, sodium, and/or potassium are adjusted such that the resultant abrasive particles have 0.02 to 0.40 weight percent, preferably 0.02 to 0.30 weight percent, more preferably 0.02 to 0.20 weight percent of $Li_2O$ (i.e., on a theoretical oxide basis where all lithium is present as $Li_2O$) or a molar equivalent amount of at least one alkali metal oxide (i.e., on a theoretical oxide basis assuming presence as the oxide form) selected from the group consisting of: $Na_2O$; $K_2O$; combinations of $Na_2O$ and $Li_2O$; combinations of $K_2O$ and $Li_2O$; combinations of $Na_2O$ and $K_2O$; and combinations of $Li_2O$, $Na_2O$, and $K_2O$.

The alumina content is typically determined largely by the content of the aforementioned ingredients. In some embodiments, the alumina content (i.e., on a theoretical oxide basis where all aluminum is present as $Al_2O_3$) is at least 91.59, 92.00, 93.00, or 94.00 weight percent and may be up to 96.00, 97.00, 98.00, 99.00 and/or to 99.48 weight percent of aluminum as $Al_2O_3$.

The initial dispersion (and/or an impregnation composition, if used, as discussed hereinafter) may further comprise additional metal oxide precursors/sources (i.e., materials that are capable of being converting into metal oxide with the appropriate heating conditions) other than the magnesium, sodium, lithium, potassium, hydrated aluminum oxides (e.g., boehmite), and seed particles. Such materials are referred to herein as metal oxide modifiers. Such metal oxide modifiers may alter the physical properties and/or chemical properties of the resulting abrasive particle. The amount of these other metal oxide modifiers incorporated into the initial dispersion and/or impregnation composition (if used) may depend, for example, on the desired composition and/or properties of the resulting sintered abrasive particle, as well as on the effect or role the additive may have on or play in the process used to make the abrasive particle.

The metal oxide modifiers may be a metal oxide (e.g., as a colloidal suspension or a sol) and/or as a metal oxide precursor (e.g., a metal salt such as metal nitrate salts (e.g., magnesium nitrate and zinc nitrate), metal acetate salts, metal citrate salts, metal formate salts, and metal chloride salts). For metal oxide particles, the metal oxide particles are generally less than 5 micrometers, or even less than one micrometer in size. The colloidal metal oxides are discrete finely divided particles of amorphous or crystalline metal oxide typically having one or more of their dimensions within a range of about 3 nanometers to about one micrometer. The colloidal metal oxide sols are typically stable (i.e., the metal oxide solids in the sol or dispersion do not appear by visual inspection to begin to gel, separate, or settle upon standing undisturbed for about 2 hours) suspension of colloidal particles (in some embodiments in a liquid medium having a pH of less than 6.5). Examples of such other metal oxide modifiers include: chromium oxide, zirconium oxide, hafnium oxide, cerium oxide, and/or silica.

Examples of useful metal oxide precursors include metal salts (e.g., metal nitrate salts, metal acetate salts, metal citrate salts, metal formate salts, and metal chloride salts). Metal nitrate, acetate, citrate, formate, and chloride salts can be made by techniques known in the art, or obtained from commercial sources such as Alfa Chemicals, Ward Hill, Mass., and Mallinckrodt Chemicals, Paris, Ky. Examples of nitrate salts include manganese nitrate, chromium nitrate, dysprosium nitrate, erbium nitrate, ytterbium nitrate, yttrium nitrate, praseodymium nitrate, neodymium nitrate, lanthanum nitrate, and europium nitrate. Examples of metal acetate salts include acetate, manganese acetate, chromium acetate, dysprosium acetate, lanthanum acetate, neodymium acetate, praseodymium acetate, samarium acetate, ytterbium acetate, yttrium acetate, ytterbium acetate. Examples of citrate salts include and manganese citrate. Examples of formate salts include lithium formate and manganese formate.

Advantageously, abrasive particles according to the present disclosure may exhibit excellent abrasive properties without including rare earth oxides, which have associated problems as discussed above. Accordingly, the abrasive particles may contain less than one, 0.5, 0.4, 0.3, 0.2, 0.1, or even less than 0.01 percent by weight of rare earth oxide(s) taken as a whole.

For additional details regarding the inclusion of metal oxide (and/or precursors thereof) in a boehmite dispersion see, for example, in U.S. Pat. No. 4,314,827 (Leitheiser et al.); U.S. Pat. No. 4,770,671 (Monroe et al.); U.S. Pat. No. 4,881,951 (Wood et al.); U.S. Pat. No. 5,429,647 (Larmie); U.S. Pat. No. 5,498,269 (Larmie); and U.S. Pat. No. 5,551,963 (Larmie).

Dispersions (e.g., boehmite-based dispersions) utilized in the practice of the present disclosure typically comprise greater than 15 percent by weight (generally from greater than 20 to about 80 percent by weight; typically greater than 30 to about 80 percent by weight) solids (or alternatively boehmite), based on the total weight of the dispersion. In some embodiments, however, dispersions comprise 35 percent by weight or more, 45 percent by weight or more, 50 percent by weight or more, 55 percent by weight or more, 60 percent by weight or more, or 65 percent by weight or more by weight or more solids (or alternatively boehmite), based on the total weight of the dispersion. Percentages by weight of solids and boehmite above about 80 percent by weight may also be useful, but tend to be more difficult to process to make the abrasive particle provided by the method according to the present disclosure.

General procedures for making alpha-alumina-based abrasive particles are disclosed for example, in U.S. Pat. No. 4,518,397 (Leitheiser et al.); U.S. Pat. No. 4,770,671 (Monroe); U.S. Pat. No. 4,744,802 (Schwabel); U.S. Pat. No. 5,139,978 (Wood); U.S. Pat. No. 5,219,006 (Wood); and U.S. Pat. No. 5,593,647 (Monroe).

The (initial) dispersion is typically prepared by adding the various constituent components, and then mixing them together to provide a homogenous mixture. For example, boehmite may be added to water that has been mixed with nitric acid. The other components may be added before, during, or after the alumina precursor (e.g., boehmite) is added.

A high-solids dispersion is typically prepared by gradually adding a liquid component(s) to a component(s) that is non-soluble in the liquid component(s), while the latter is mixing or tumbling. For example, a liquid containing water, nitric acid, and metal salt may be gradually added to boehmite, while the latter is being mixed such that the liquid is more easily distributed throughout the boehmite.

Suitable mixers include pail mixers, sigma blade mixers, ball mill and high shear mixers. Other suitable mixers may be available from Eirich Machines, Inc., Gurnee, Ill.; Hosokawa-Bepex Corp., Minneapolis, Minn. (including a mixer available under the trade designation SCHUGI FLEX-O-MIX, Model FX-160); and Littleford-Day, Inc., Florence, Ky.

Boehmite-based dispersions may be heated to increase the dispersibility of the alpha-alumina monohydrate, other particulate material, and/or to create a homogeneous dispersion.

The temperature may vary to convenience, for example the temperature may range from about 20° C. to 80° C., usually between 25° C. and 75° C. In addition or alternatively, for example, the dispersion may be heated under a pressure ranging from 1.5 to 130 atmospheres of pressure.

Boehmite-based dispersions typically gel prior to, or during, drying. The addition of most modifiers may result in the dispersion gelling faster. Alternatively, ammonium acetate or other ionic species may be added to induce gelation of the dispersion. The pH of the dispersion and concentration of ions in the gel generally determines how fast the dispersion gels. Typically, the pH of the dispersion is within a range of about 1.5 to about 5.

The dispersion may be extruded. It may be preferable to extrude (typically a dispersion where at least 50 percent by weight of the alumina content is provided by particulate (e.g., boehmite), including in this context a gelled dispersion, or even partially deliquified dispersion. The extruded dispersion, referred to as extrudate, can be extruded into elongated precursor material (e.g., rods (including cylindrical rods and elliptical rods)). After firing, the rods may have an aspect ratio of from 1.5 to 10, in some embodiments of from 2 to 6. Alternatively, the extrudate may be in the form of a very thin sheet, see for example U.S. Pat. No. 4,848,041 (Kruschke). Examples of suitable extruders include ram extruders, single screw, twin screw, and segmented screw extruders.

The dispersion can be compacted, for example, prior to or during extrusion (wherein the extrusion step may inherently involve compaction of the dispersion). In compacting the dispersion, it is understood that the dispersion is subjected to a pressure or force such as experienced, for example, in a pelletizer or die press (including mechanical, hydraulic and pneumatic or presses) or an extruder (i.e., all or substantially all of the dispersion experiences the specified pressure). In general, compacting the dispersion reduces the amount of air or gases entrapped in the dispersion, which in turn generally produces a less porous microstructure. Additionally, a compaction step may result in an easier way to continuously feed the extruder and thus may save on labor.

The dispersion is converted into abrasive precursor particles (i.e., particles of that can be converted into abrasive particles, e.g., by drying and sintering). In general, techniques for drying the dispersion are known in the art, including heating to promote evaporation of the liquid medium, or simply drying in air. The drying step generally removes a significant portion of the liquid medium from the dispersion; however, there still may be a minor portion (e.g., about 10 percent or less by weight) of the liquid medium present in the dried dispersion. Typical drying conditions include temperatures ranging from about room temperature to over about 200° C., more typically between 50° C. and 150° C., although this is not a requirement. The times may range from about 30 minutes to over days. To minimize salt migration, it may be preferable to dry the dispersion at low temperature.

After drying, the dried dispersion may be converted into abrasive precursor particles. One typical means to generate these abrasive precursor particles is by a crushing technique. Various crushing or comminuting techniques may be employed such as a roll crusher, jaw crusher, hammer mill, ball mill and the like. Coarser particles may be re-crushed to generate finer particles. In some embodiments, the dried dispersion is crushed, as it is typically easier to crush dried gel than sintered alpha-alumina based abrasive particles according to the present disclosure.

Alternatively, for example, the mixture may be converted into abrasive precursor particles prior to drying. This may occur for instance if the mixture is processed into a preferred particle shape and particle size distribution. For example, the dispersion may be extruded into rods that are subsequently cut to the preferred lengths and then dried. Alternatively, for example, the mixture may be molded into a triangular shape particle and then dried. Additional details concerning triangular shaped particles may be found in U.S. Pat. No. 5,201,916 (Berg et al.). Still other shapes of abrasive particles that are formed by a sol-gel molding process are described in, for example, in U.S. Pat. No. 8,142,891 B2 (Culler et al.); U.S. Pat. No. 8,034,137 B2 (Erickson et al.); U.S. Pat. No. 8,142,532 B2 (Erickson et al.); U.S. Pat. No. 8,142,531 B2 (Adefris et al.); U.S. Pat. No. 8,123,828 A (Culler et al.); and in U.S. Pat. Appl. Publ. 2010/0146867 A1 (Boden et al.), and PCT International Publ. No. WO 2011/109188 A2 (Givot et al.).

In another embodiment, for example, the dried mixture (e.g., dispersion) may be shaped into lumps with a high content of volatilizable components, which are then explosively comminuted by feeding the lumps directly into a furnace held at a temperature above 350° C., usually a temperature between 600° C. and 900° C.

It is also within the scope of the present disclosure to impregnate a metal oxide modifier source (typically a metal oxide precursor) into a dried and/or calcined abrasive precursor particle. Typically, the metal oxide precursors are in the form metal salts. Exemplary useful metal oxide precursors and metal salts are described herein above with respect to the initial dispersion.

Methods of impregnating sol-gel-derived dried and/or calcined particles are described in general, for example, in U.S. Pat. No. 5,164,348 (Wood). In general, ceramic precursor material (i.e., dried alumina-based mixture (or dried ceramic precursor material), or calcined alumina-based mixture (or calcined ceramic precursor material)) is porous. For example, a calcined ceramic precursor material typically has pores about 2-15 nanometers in diameter extending therein from an outer surface. The presence of such pores allows an impregnation composition comprising a mixture comprising liquid medium (typically water) and appropriate metal precursor to enter into ceramic precursor material. The metal salt material is dissolved in a liquid, and the resulting solution mixed with the porous ceramic precursor particle material. The impregnation process is thought to occur through capillary action.

The liquid used for the impregnating composition can be, for example, water (including deionized water), an organic solvent, and mixtures thereof if impregnation of a metal salt is preferred, the concentration of the metal salt in the liquid medium is typically in the range from about 5 to about 40 percent dissolved solids, on a theoretical metal oxide basis. In some embodiments, there is at least 50 milliliters (ml) of solution added to achieve impregnation of 100 grams (g) of porous precursor particulate material, and, for example, in some embodiments, at least about 60 ml of solution to 100 g of precursor particulate material.

Typically, the abrasive precursor particles are calcined, prior to sintering, although a calcining step is not a requirement. In general, techniques for calcining the abrasive precursor particles, wherein essentially all the volatiles are removed, and the various components that were present in the dispersion are transformed into oxides, are known in the art. Such techniques include using a rotary or static furnace to heat dried mixture at temperatures ranging from about 400 to 1000° C. (typically from about 450 to 800° C.) until the free water, and typically until at least about 90 percent by weight of any bound volatiles are removed.

After the abrasive precursor particles are formed, and optionally calcined, the abrasive precursor particles are sintered to provide alpha-alumina-based abrasive particles. In general, techniques for sintering the abrasive precursor particles, which include heating at a temperature effective to transform transitional alumina(s) into alpha-alumina, causing all of the metal oxide precursors to either react with the alumina or form metal oxide, and increasing the density of the ceramic material, are known in the art. The abrasive precursor particles may be sintered by heating (e.g., using electrical resistance, microwave, plasma, laser, or gas combustion, on batch basis or a continuous basis). Sintering temperatures are usually range from about 1200° C. to about 1650° C.; typically, from about 1200° C. to about 1500° C.; more typically, less than 1450° C. The length of time which the abrasive precursor particles are exposed to the sintering temperature depends, for example, on particle size, composition of the particles, and sintering temperature. Typically, sintering times range from a few seconds to about 60 minutes (in some embodiments, within about 3-30 minutes). Sintering is typically accomplished in an oxidizing atmosphere, although inert or reducing atmospheres may also be useful.

The longest dimension of abrasive particles according to the present disclosure is typically at least about one micrometer, although it may be less. The abrasive particles described herein can be readily made with a length of greater than about 50 micrometers, and larger abrasive particles (e.g., greater than about one millimeter or even greater than about 5 millimeters) can also be readily made. In some embodiments, abrasive particles have length(s) in the range from about 0.1 to about 5 millimeters (typically in the range from about 0.1 to about 3 millimeters), although other sizes are also useful, and may even be more preferable for certain applications. In another aspect, abrasive particles according to the present disclosure, typically have an aspect ratio of at least 1.2:1 or even 1.5:1, sometimes at least 2:1, and alternatively, at least 2.5:1.

Dried, calcined, and/or sintered materials provided during or by a method according to the present disclosure, are typically screened and graded using techniques known in the art. For example, the dried particles may be screened to a preferred size prior to calcining. Sintered abrasive particles are typically screened and graded prior to use in an abrasive application or incorporation into an abrasive article.

It is also within the scope of the present disclosure to recycle unused (typically particles too small in size to provide the preferred size of sintered abrasive particles) deliquified mixture (typically dispersion) material as generally described, for example, in U.S. Pat. No. 4,314,827 (Leitheiser et al.). For example, a first dispersion can be made as described above, dried, crushed, and screened, and then a second dispersion made by combining, for example, liquid medium (e.g., aqueous), boehmite, and deliquified material from the first dispersion, and optionally metal oxide and/or metal oxide precursor. The recycled material may provide, on a theoretical metal oxide basis, for example, at least 10 percent, at least 30 percent, at least 50 percent, or even up to (and including) 100 percent of the theoretical $Al_2O_3$ content of the dispersion which is deliquified and converted (including calcining and sintering) to provide the sintered abrasive particles.

It is also within the scope of the present disclosure to coat the abrasive particles with a surface coating, for example, as described in U.S. Pat. No. 1,910,440 (Nicholson); U.S. Pat. No. 3,041,156 (Rowse); U.S. Pat. No. 5,009,675 (Kunz et al.); U.S. Pat. No. 4,997,461 (Markhoff-Matheny et al.); U.S. Pat. No. 5,042,991 (Kunz et al.); U.S. Pat. No. 5,011,508 (Wald et al.); and U.S. Pat. No. 5,213,591 (Celikkaya et al.).

In some embodiments, abrasive particles according to the present disclosure (e.g., sintered alpha-alumina-based abrasive particles) further comprise a zirconia coating. Although not wanting to be bound by theory, it is believed that such coated abrasive particles are particularly useful in bonded abrasives utilizing a vitrified bond as the coating adds texture to the surface of the abrasive particles thereby increasing mechanical adhesion of the abrasive particles to the vitrified binder. Further, it is believed such coating protects the abrasive particles from reacting with the vitrified binder and weakening the abrasive particle.

Such zirconia coatings can be applied, for example, by the impregnation method described above, wherein the zirconia source is, for example zirconium oxynitrate and/or zirconium hydroxynitrate.

Typically, abrasive particles according to the present disclosure have an average alpha-alumina crystallite size in a range from 0.05 micrometers to 20 micrometers, and in some embodiments, in a range from 0.1 micrometer to 1.0 micrometers, although this is not a requirement.

Abrasive particles made according the present disclosure may have a variety of densities, typically depending on process conditions (e.g., sintering conditions). Useful densities will typically depend on the intended end use. In some embodiments, abrasive particles according to the present disclosure have a density (i.e., true density) of at least 3.7, 3.75, 3.8, 3.85, 3.9, or even at least 3.95 $g/cm^3$, although other densities may also be used.

Abrasive particles according to the present disclosure may exhibit excellent hardness. Accordingly, in some embodiments, they may have an average hardness of at least 19, 20, or even at least 21 gigapascals (GPa).

The average hardness of the material of the present disclosure can be determined as follows. Sections of the material are mounted in mounting resin (obtained under the trade designation TRANSOPTIC POWDER from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation ECOMET 3). The sample is polished for about 3 minutes with a 70 micrometer diamond wheel, followed by 5 minutes of polishing with each of 45, 30, 15, 9, 3, and 1-micrometer slurries. The microhardness measurements can be made using a conventional microhardness tester (such as that obtained under the trade designation MITUTOYO MVK-VL from Mitutoyo Corporation, Tokyo, Japan) fitted with a Vickers indenter, e.g., using a 500-gram indent load. Microhardness measurements are made according to the guidelines stated in ASTM Test Method E384 "Test Methods for Microhardness of Materials" (1991).

Without wishing to be bound by theory, abrasive particles according to the present disclosure are believed to include an alpha-alumina crystalline phase and a beta-alumina crystalline phase.

Certain rare earth oxides and divalent metal cations react with alumina to form a rare earth aluminate represented by the formula $LnMAl_{11}O_{19}$, wherein Ln is a trivalent metal cation such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, $Sr^{2+}$, $Ca^{2+}$, or $Co^{2+}$. Such aluminates, which are typically in the form of platelets, have a hexagonal crystal structure and are known in the art as magnetoplumbites.

In some embodiments, abrasive particles according to the present disclosure are advantageously essentially free of (e.g., contain less than 0.01 weight percent of) rare earth oxide (REO) and REO magnetoplumbite crystalline phase domains. Accordingly, the abrasive particles comprise less than one percent by weight (e.g., less than 0.9, 0.8, 0.7, 0.6, 0.5, 0.4, 0.3, 0.2, 0.1, or even less than 0.005 percent by weight, or none) of material having a magnetoplumbite crystalline phase.

Abrasive particles according to the present disclosure may be, for example, crushed or shaped.

Abrasive particles according to the present disclosure, and especially crushed abrasive particles, can be screened and graded using techniques well known in the art, including the use of an abrasives industry recognized grading standards such as ANSI (American National Standard Institute), FEPA (Federation of European Producers of Abrasives), and JIS (Japanese Industrial Standard). Abrasive particles according to the present disclosure may be used in a wide range of particle sizes, typically ranging in size from about 0.1 to about 5000 micrometers, more typically from about one to about 2000 micrometers; preferably from about 5 to about 1500 micrometers, more preferably from about 100 to about 1500 micrometers.

ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS10,000.

Shaped abrasive particles according to the present disclosure have non-random shapes, generally imparted by the method used to form them. For example, shaped abrasive particles may be shaped as pyramids, truncated pyramids, rods, or cones. Shaped abrasive particles can be made by extrusion or screen printing of a sol-gel mixture (e.g., as described in U.S. Pat. No. 6,054,093 (Torre, Jr. et al)), or by a sol-gel molding process using a production tool (i.e., mold) as described in, for example, U.S. Pat. Appln. Publ. Nos. 2010/0146867 A1 (Boden et al.); 2010/0151195A1 (Culler et al.); 2010/0151196 A1 (Adefris et al.); 2009/0165394 A1 (Culler et al.); and 2010/0151201A1 (Erickson et al.). In these methods it may be desirable to include a mold release compound in the initial dispersion, or to coat the mold release onto the mold surface, to aid in removing the particles from the mold if desired. Typical mold release agents include oils such as peanut oil or mineral oil, fish oil, silicones, polytetrafluoroethylene, zinc stearate, and graphite.

In another aspect, the present disclosure provides agglomerate abrasive particles each comprise a plurality of abrasive particles according to the present disclosure bonded together via a binder.

In another aspect, the present disclosure provides an abrasive article (e.g., coated abrasive articles, bonded abrasive articles (including vitrified, resinoid, and metal-bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) according to the present disclosure. Methods of making such abrasive articles and using abrasive articles are well known to those skilled in the art. Furthermore, abrasive particles according to the present disclosure can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. Examples of suitable backing materials include woven fabric, polymeric film, vulcanized fiber, a nonwoven fabric, a knit fabric, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

An exemplary embodiment of a coated abrasive article according to the present disclosure is depicted in FIG. 1. Referring to FIG. 1, coated abrasive article 100 has a backing 120 and abrasive layer 130. Abrasive layer 130 includes abrasive particles 140 according to the present disclosure secured to a major surface 170 of backing 120 (substrate) by make coat 150 and size coat 160. Additional layers, for example, such as an optional supersize layer (not shown) that is superimposed on the size layer, or a backing antistatic treatment layer (not shown) may also be included, if desired.

Figure 2:
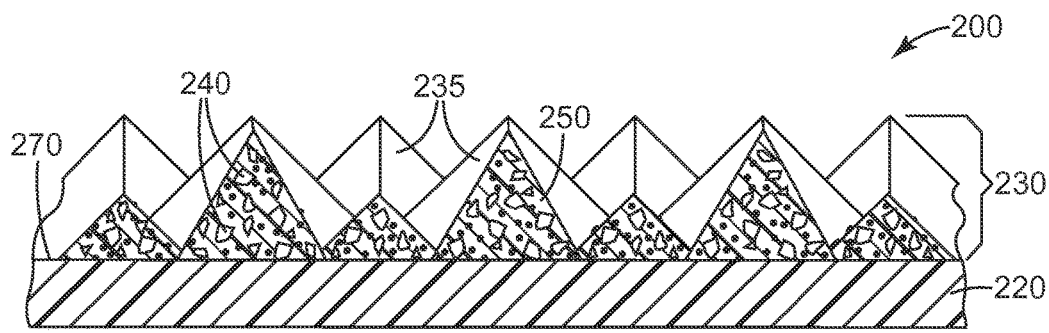
FIG. 2 is a schematic cross-sectional view of another exemplary coated abrasive article including abrasive particles according to the present disclosure.

Another exemplary a coated abrasive article according to the present disclosure is depicted in FIG. 2. Referring to FIG. 2, exemplary coated abrasive article 200 has a backing 220 (substrate) and structured abrasive layer 230. Structured abrasive layer 230 includes a plurality of shaped abrasive composites 235 comprising abrasive particles 240 according to the present disclosure dispersed in a binder material 250 secured to a major surface 270 of backing 220.

Coated abrasive articles according to the present disclosure may include additional layers such as, for example, an optional supersize layer that is superimposed on the abrasive layer, or a backing antistatic treatment layer may also be included, if desired.

Further details regarding coated abrasive articles can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,961,674 (Gagliardi et al.), and U.S. Pat. No. 5,975,988 (Christianson).

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about one cm to over one meter; the diameter of cut off wheels about one cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g., double disc grinder) or other conventional bonded abrasive shape. Bonded abrasive articles typically comprise about 3 to 50 percent by volume of bond material, about 30 to 90 percent by volume abrasive particles (or abrasive particle blends), up to 50 percent by volume additives (including grinding aids), and up to 70 percent by volume pores, based on the total volume of the bonded abrasive article.

Figure 3:
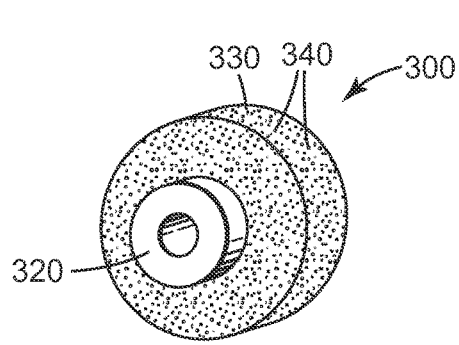
FIG. 3 is a schematic perspective view of an exemplary bonded abrasive article including abrasive particles according to the present disclosure.

An exemplary form is a grinding wheel. Referring to FIG. 3, grinding wheel 300 according to the present disclosure includes abrasive particles 340 according to the present disclosure, retained by a binder material 330, molded into a wheel, and mounted on hub 320.

Further details regarding bonded abrasive articles can be found, for example, in U.S. Pat. No. 4,543,107 (Rue); U.S. Pat. No. 4,741,743 (Narayanan et al.); U.S. Pat. No. 4,800, 685 (Haynes et al.); U.S. Pat. No. 4,898,597 (Hay et al.); U.S. Pat. No. 4,997,461 (Markhoff-Matheny et al.); U.S. Pat. No. 5,037,453 (Narayanan et al.); and U.S. Pat. No. 5,863, 308 (Qi et al.).

Figure 4:
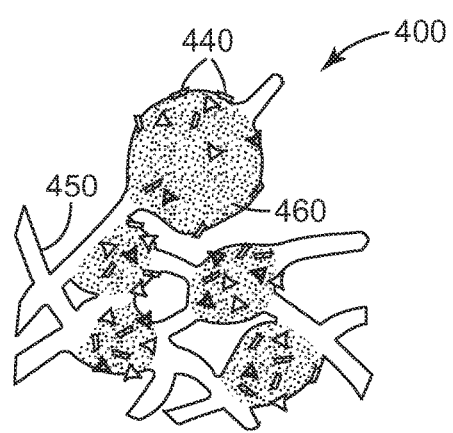
FIG. 4 is an enlarged schematic view of a nonwoven abrasive article including abrasive articles according to the present disclosure.

Nonwoven abrasive articles typically include an open porous lofty polymer filament structure having abrasive particles according to the present disclosure distributed throughout the structure and adherently bonded therein by an organic binder. Examples of filaments include polyester fibers, polyamide fibers, and polyaramid fibers. In FIG. 4, a schematic depiction, enlarged about 100x, of an exemplary nonwoven abrasive article 400 according to the present disclosure is provided. Such a nonwoven abrasive article according to the present disclosure comprises a lofty open nonwoven fiber web 450 (substrate) onto which abrasive particles 440 according to the present disclosure are adhered by binder material 460.

Further details regarding nonwoven abrasive articles can be found, for example, in U.S. Pat. No. 2,958,593 (Hoover et al.); U.S. Pat. No. 4,227,350 (Fitzer); U.S. Pat. No. 4,991,362 (Heyer et al.); U.S. Pat. No. 5,712,210 (Windisch et al.); U.S. Pat. No. 5,591,239 (Edblom et al.); U.S. Pat. No. 5,681,361 (Sanders); U.S. Pat. No. 5,858,140 (Berger et al.); U.S. Pat. No. 5,928,070 (Lux); and U.S. Pat. No. 6,017,831 (Beardsley et al.).

Useful abrasive brushes include those having a plurality of bristles unitary with a backing (see, e.g., U.S. Pat. No. 5,443,906 (Pihl et al.); U.S. Pat. No. 5,679,067 (Johnson et al.); and U.S. Pat. No. 5,903,951 (Ionta et al.). Preferably, such brushes are made by injection molding a mixture of polymer and abrasive particles.

Suitable binder materials include organic binders such as, for example, thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant alpha, beta-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, and/or graphite), coupling agents (e.g., silanes, titanates, and/or zircoaluminates), plasticizers, suspending agents, and the like. The amounts of these optional additives are selected to provide the preferred properties. The coupling agents can improve adhesion to the abrasive particles and/or filler. The binder chemistry may be thermally cured, radiation cured or combinations thereof. Additional details on binder chemistry may be found in U.S. Pat. No. 4,588, 419 (Caul et al.); U.S. Pat. No. 4,751,138 (Tumey et al.); and U.S. Pat. No. 5,436,063 (Follett et al.).

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present disclosure may be in the shape of a wheel (including cut off wheels), honing stone, mounted pointed or other conventional bonded abrasive shape. An exemplary vitrified bonded abrasive article according to the present disclosure is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100 percent glass frit, although more typically the composition comprises 20 to 80 percent glass frit, or 30 to 70 percent glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials may include those comprising silica, alumina (preferably, at least 10 percent by weight alumina), and boria (preferably, at least 10 percent by weight boria). In most cases the vitrified bonding material further comprises alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. A combination of different grinding aids may be used, and in some instances this may produce a synergistic effect.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50-300 g/m$^2$ (preferably, about 80-160 g/m$^2$). In vitrified bonded abrasive articles grinding aid is typically impregnated into the pores of the article.

The abrasive articles can contain 100 percent abrasive particles according to the present disclosure, or blends of such abrasive particles with other abrasive particles and/or diluent particles. However, at least about 2 percent by weight, preferably at least about 5 percent by weight, and more preferably about 30 percent to 100 percent by weight, of the abrasive particles in the abrasive articles should be abrasive particles according to the present disclosure.

In some instances, the abrasive particles according the present disclosure may be blended with another abrasive particles and/or diluent particles at a ratio between 5 and 75 percent by weight, about 25 to 75 percent by weight about 40 to 60 percent by weight, or about 50 to 50 percent by weight (i.e., in equal amounts by weight).

Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles. The conventional sol-gel-derived abrasive particles may be seeded or non-seeded. Likewise, they may be randomly shaped or have a shape associated with them, such as a rod or a triangle. In some instances, blends of abrasive particles may result in an abrasive article that exhibits improved grinding performance in comparison with abrasive articles comprising 100 percent of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present disclosure, with the smaller sized particles being another abrasive particle type. Conversely, for example, the smaller sized abrasive particles may be abrasive particles according to the present disclosure, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads, and diluent agglomerates.

Abrasive particles according to the present disclosure can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be, for example, a block, cylinder, pyramid, coin, or a square. Abrasive agglomerate particles typically have particle sizes ranging from about 100 to about 5000 micrometers, typically about 250 to about 2500 micrometers.

The abrasive particles may be uniformly distributed in the abrasive article or concentrated in selected areas or portions of an abrasive article. For example, in a coated abrasive, there may be two layers of abrasive particles. The first layer comprises abrasive particles other than abrasive particles according to the present disclosure, and the second (outermost) layer comprises abrasive particles according to the present disclosure. Likewise in a bonded abrasive, there may be two distinct sections of the grinding wheel. The outermost section may comprise abrasive particles according to the present disclosure, whereas the innermost section does not. Alternatively, abrasive particles according to the present disclosure may be uniformly distributed throughout the bonded abrasive article.

The present disclosure provides a method of abrading a workpiece. The method comprises: frictionally contacting abrasive particles according to the present disclosure with a surface of the workpiece, and moving at least one of the abrasive particles and the surface of the workpiece relative to the other to abrade at least a portion of the surface of the workpiece. Methods for abrading with abrasive particles according to the present disclosure include, for example, snagging (i.e., high-pressure high stock removal) to polishing (e.g., polishing medical implants with coated abrasive belts), wherein the latter is typically done with finer grades (e.g., ANSI 220 and finer) of abrasive particles. The abrasive particles may also be used in precision abrading applications such as grinding cam shafts with vitrified bonded wheels. The size of the abrasive particles used for a particular abrading application will be apparent to those skilled in the art.

Abrading may be carried out dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Examples of workpieces include aluminum metal, carbon steels, mild steels (e.g., 1018 mild steel and 1045 mild steel), tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms (kg), although other pressures can also be used.

SELECT EMBODIMENTS OF THE PRESENT DISCLOSURE

In a first embodiment, the present disclosure provides abrasive particles, wherein the abrasive particles comprise the components:

a) 0.50 to 5.00 weight percent of seed particles for alpha-alumina formation selected from the group consisting of alpha-$Fe_2O_3$ seed particles, alpha-$Al_2O_3$ seed particles, and combinations thereof;

b) 0.50 to 5.00 weight percent of MgO;

c) 0.02 to 0.40 weight percent of $Li_2O$ or a molar equivalent amount of at least one alkali metal oxide selected from the group consisting of: $Na_2O$; $K_2O$; combinations of $Na_2O$ and $Li_2O$; combinations of $K_2O$ and $Li_2O$; combinations of $Na_2O$ and $K_2O$; and combinations of $Li_2O$, $Na_2O$, and $K_2O$; and d) 91.08 to 99.48 weight percent of $Al_2O_3$.

In a second embodiment, the present disclosure provides abrasive particles according to the first embodiment, wherein the abrasive particles consist of components a), b), c), and d).

In a third embodiment, the present disclosure provides abrasive particles according to the first or second embodiment, wherein component c) comprises 0.03 to 0.70 weight percent of $Na_2O$.

In a fourth embodiment, the present disclosure provides abrasive particles according to the first or second embodiment, wherein component c) comprises 0.05 to 1.00 weight percent of $K_2O$.

In a fifth embodiment, the present disclosure provides abrasive particles according to any one of the first to fourth embodiments, wherein the abrasive particles comprise an alpha-alumina crystalline phase and from 0.25 to 20 percent by weight of a beta-alumina crystalline phase.

In a sixth embodiment, the present disclosure provides abrasive particles according to any one of the first to fifth embodiments, wherein the abrasive particles comprise less than 10 percent by weight of magnetoplumbite crystalline phases.

In a seventh embodiment, the present disclosure provides abrasive particles according to any one of the first to sixth embodiments, wherein the abrasive particles have a density of at least 3.7 $g/cm^3$ and a hardness of at least 19 GPa.

In an eighth embodiment, the present disclosure provides abrasive particles according to any one of the first to seventh embodiments, wherein the abrasive particles conform to an abrasives industry specified nominal grade.

In a ninth embodiment, the present disclosure provides abrasive particles according to the eighth embodiment, wherein the abrasives industry specified nominal grade is selected from the group consisting of ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

In a tenth embodiment, the present disclosure provides abrasive particles according to the eighth embodiment, wherein the abrasives industry specified nominal grade is selected from the group consisting of P8, P12, P16, P24, P36, P40, P50, P60, P80, P100, P120, P150, P180, P220, P320, P400, P500, P600, P800, P1000, and P1200.

In an eleventh embodiment, the present disclosure provides abrasive particles according to the eighth embodiment, wherein the abrasives industry specified nominal grade is selected from the group consisting of JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS10,000.

In a twelfth embodiment, the present disclosure provides a method of abrading a workpiece, the method comprising:
frictionally contacting abrasive particles according to any one of claims 1 to 11 with a surface of the workpiece, and
moving at least one of the abrasive particles and the surface of the workpiece relative to the other to abrade at least a portion of the surface of the workpiece.

In a thirteenth embodiment, the present disclosure provides a method according to the twelfth embodiment, wherein the workpiece comprises stainless steel.

In a fourteenth embodiment, the present disclosure provides an abrasive article comprising abrasive particles according to any one of the first to eleventh embodiments retained in a binder material.

In a fifteenth embodiment, the present disclosure provides an abrasive article according to the fourteenth embodiment, wherein the binder material is disposed on a substrate.

In a sixteenth embodiment, the present disclosure provides an abrasive article according to the fifteenth embodiment, wherein the abrasive article comprises an abrasive layer comprising the abrasive particles and the binder material secured to a major surface of a backing, and wherein the abrasive layer comprises a make coat and a size coat.

In a seventeenth embodiment, the present disclosure provides an abrasive article according to the fifteenth embodiment, wherein the abrasive article comprises an abrasive layer comprising the abrasive particles and the binder material secured to a major surface of a backing, and wherein the abrasive layer comprises a plurality of shaped abrasive composites.

In an eighteenth embodiment, the present disclosure provides an abrasive article according to the fifteenth embodiment, wherein the substrate comprises a lofty open nonwoven fiber web.

In a nineteenth embodiment, the present disclosure provides an abrasive article according to the fourteenth embodiment, wherein the abrasive article comprises a bonded abrasive article.

In a twentieth embodiment, the present disclosure provides a method of making abrasive particles, the method comprising:
i) providing a dispersion comprising:
an alpha-alumina precursor;
alkali metal cations selected from the group consisting of $Li^+$, $Na^+$, $K^+$, and combinations thereof;
magnesium oxide or a precursor thereof; and
seed particles selected from the group consisting of alpha-$Fe_2O_3$ seed particles and alpha-$Al_2O_3$ seed particles, or a precursor thereof, wherein the seed particles facilitate conversion of the alumina precursor material to alpha-alumina upon sintering;
ii) converting the dispersion to abrasive precursor particles; and
iii) sintering the abrasive precursor particles to provide the abrasive particles, wherein the abrasive particles comprise the components:
a) 0.50 to 5.00 weight percent of the seed particles;
b) 0.50 to 5.00 weight percent of MgO;
c) 0.02 to 0.40 weight percent of $Li_2O$ or a molar equivalent amount of at least one alkali metal oxide selected from the group consisting of: $Na_2O$; $K_2O$; combinations of $Na_2O$ and $Li_2O$; combinations of $K_2O$ and $Li_2O$; combinations of $Na_2O$ and $K_2O$; and combinations of $Li_2O$, $Na_2O$, and $K_2O$; and
d) 91.08 to 99.48 weight percent of $Al_2O_3$.

In a twenty-first embodiment, the present disclosure provides a method according to the twentieth embodiment, wherein the abrasive particles consist of components a), b), c), and d).

In a twenty-second embodiment, the present disclosure provides a method according to the twentieth or twenty-first embodiment, wherein component c) comprises 0.03 to 0.70 weight percent of $Na_2O$.

In a twenty-third embodiment, the present disclosure provides a method according to the twentieth or twenty-first embodiment, wherein component c) comprises 0.05 to 1.00 weight percent of $K_2O$.

In a twenty-fourth embodiment, the present disclosure provides a method according to any one of the twentieth to twenty-third embodiments, wherein the abrasive particles comprise an alpha-alumina crystalline phase and from 0.25 to 20 percent by weight of a beta-alumina crystalline phase, based on the total weight of the alpha-alumina crystalline phase and the beta-alumina crystalline phase combined.

In a twenty-fifth embodiment, the present disclosure provides a method according to any one of the twentieth to twenty-fourth embodiments, wherein each of the abrasive particles comprises less than 10 percent by weight of magnetoplumbite crystalline phases.

In a twenty-sixth embodiment, the present disclosure provides a method according to any one of the twentieth to twenty-fifth embodiments, wherein said converting the dispersion to the abrasive precursor particles comprises a drying step.

In a twenty-seventh embodiment, the present disclosure provides a method according to the twentieth embodiment, wherein said converting the dispersion to the abrasive precursor particles comprises a drying step followed by a calcining step.

In a twenty-eighth embodiment, the present disclosure provides a method according to any one of the twentieth to twenty-seventh embodiments, wherein the seed particles comprise at least one of alpha-alumina, alpha-$Fe_2O_3$, or a precursor thereof.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. In the following examples, the term "NA" means not applicable, and the term "NM" means not measured.

A summary of various raw materials used to prepare the examples is provided in Table 1 (below).

The abrasive particles of Example 1 were made by preparing a boehmite sol-gel using the following recipe: DISPERAL aluminum oxide monohydrate powder (700 parts by weight, from Sasol North America) was dispersed by high shear mixing a dispersion containing water (1480 parts by weight) and 70% aqueous nitric acid (38 parts by weight) and 115 g of a 7.2% iron oxide seed slurry for 1 minute using a 4 liter WARING Blender (Conair Corporation, Stamford Conn.). The resulting sol was poured evenly into a 22 cm by 33 cm by 5 cm PYREX tray and dried in a forced air oven at 95° C. for about 24 hours.

The resulting dried material was crushed using a BRAUN TYPE UD pulverizer having a 1.1 mm gap between the steel plates to form particles. The particles were screened to provide 0.125 to 1 mm sized particles.

The screened particles were calcined at about 700° C. using a conventional rotary calciner which was a 23 cm diameter 4.3 meter long stainless steel tube having a 2.9 meter hot zone, the tube being inclined at 2.4 degrees with respect to the horizontal, and rotating at 7 rpm, to provide residence time therein of about 10 minutes. The calciner had a hot zone feed end temperature of 350° C. and exit end temperature of 700° C.

The resulting calcined particles were cooled to room temperature and then impregnated with an impregnation solution. About 180 ml of the impregnation solution was combined with about 300 grams of the calcined particles. The impregnation solution and the calcined particles were thoroughly mixed together to cause the solution to be impregnated into the calcined particles by capillary action.

TABLE 1

| RAW MATERIALS | EQUIVALENT PERCENT BY WEIGHT AS OXIDE IN AQUEOUS SOLUTION/ DISPERSION | SOURCE |
| --- | --- | --- |
| $Mg(NO_3)_2$ | 10.5 | Hawkins, Inc., St Paul, Minnesota |
| $NaNO_3$ | 11.7 | Thermo Fisher Scientific Inc., Waltham, Massachusetts. |
| $LiNO_3$ | 3.9 | Thermo Fisher Scientific Inc. |
| $KNO_3$ | 12.7 | Thermo Fisher Scientific Inc. |
| iron oxide seed | 7.2 | iron oxyhydroxide (alpha-FeOOH), aqueous dispersion (pH = 5.0-5.5), about 90-95% of which is goethite, acicular particles with an average particle size of about 0.05 to 0.1 micrometer, a length to diameter or width ratio of about 1:1 to 3:1, and a surface area of about 100 $m^2/g$; dispersion yields 3% to 7% by weight $Fe_2O_3$ |
| $Al_2O_3$ seed | 41 | prepared generally according to paragraph [0024] of U.S. Pat. Appln. Publ. 2008/0148653 A1 (Bauer et al.) |
| Resole Phenolic Resin | NA | metal hydroxide catalyzed phenol-formaldehyde resin, ca. 75 percent in water |
| Epoxy Resin | NA | EPON 828 epoxy resin obtained from Momentive Specialty Chemicals, Columbus, Ohio |
| Filler | NA | calcium carbonate having a particle size less than 46 micrometers and an average particle size of about 15 micrometers, obtained as GEORGIA MARBLE NO. 10 from Georgia Marble, Gantts Quarry, Alabama |
| Grinding aid 1 | NA | cryolite, obtained as RTN Cryolite from TR International Trading Co., Houston, Texas |
| Grinding aid 2 | NA | Potassium tetrafluoroborate obtained from Solvay Fluorides LLC, Houston, Texas |
| Surfactant 1 | NA | 0.5 percent ethoxylated oleic acid surfactant, obtained as EMULON A from BASF Corp., Mount Olive, New Jersey |
| Surfactant 2 | NA | AEROSOL OT-NV surfactant obtained from Cytec Industries, Woodland Park, New jersey |
| Curing Agent | NA | IMICURE EMI 24 curing agent obtained from Air Products and Chemicals, Allentown, Pennsylvania |
| Anti-foam | NA | ANTIFOAM 1430 antifoaming agent obtained from Dow Corning Corporation, Midland, Michigan |

The impregnation solution was prepared by adding a sufficient amount of sodium nitrate and magnesium nitrate to provide fired, sintered abrasive particles having the composition shown in Table 2.

Abrasive particles were allowed to dry after which the particles were again calcined at 650° C. and sintered at approximately 1400° C. Both the calcining and sintering was performed using rotary tube kilns The resulting sintered abrasive particles exited the kiln into room temperature air where it was collected in a metal container and allowed to cool to room temperature.

All Examples and Comparative Examples were prepared identically to Example 1, except that the modifier composition and seed content was changed as shown in Table 2.

The densities of the fired, sintered abrasive particles were determined using a Micromeritics (Norcross, Ga.) ACCU-PYC 1330 helium pycnometer. The results are reported in Table 3.

The Vickers microhardness of the abrasive grains was measured using a conventional microhardness tester with a diamond indenter (commercially available as MINILOAD 2 MICROHARDNESS TESTER from E. Leitz GmbH, Wetzlar, Germany). The indenter (a highly polished pointed square pyramidal diamond with a face angle of 136 degrees) was brought into contact gradually and smoothly with the sample to be measured. The predetermined load was 500 grams. The average of 10 measurements was reported for each example in Table 3.

Abrasive Disc Preparation Method

Discs with a 7-inch (17.8 cm) diameter and ⅞-inch (2.2-cm) diameter arbor holes of a vulcanized fiber backing having a thickness of 0.83 mm (33 mils) (obtained as DYNOS VULCANIZED FIBRE from DYNOS GmbH, Troisdorf, Germany) were coated with 3.5 grams/disc (g/disc) of a make coat composition consisting of 49.15 parts by weight of Resole Phenolic Resin, 40.56 parts by weight of Filler, 0.1 part Surfactant 1, and 10.19 parts by weight of water. The discs were then electrostatically coated with 18.0 g/disc of abrasive particles, and then 15.0 g/disc of a size coat composition consisting of 29.42 parts by weight of Resole Phenolic Resin, 50.65 parts by weight of Grinding Aid 1, 1.81 parts by weight of Surfactant 1, and 18.12 parts by weight of water. The discs were then heated at 90° C. for 90 minutes. The partially-cured discs were then further coated with 9 grams of a supersize coat consisting of 30.96 parts by weight of Epoxy Resin, 56.34 parts by weight of Grinding Aid 2, 0.78 part Surfactant 2, 0.36 part Curing Agent, 0.04 part Anti-foam, and 11.52 parts by weight of water. Following curing at 102° C. for 12 hours, the resultant abrasive discs were flexed.

Grinding Test

Abrasive discs were tested using the following procedure. Abrasive discs for evaluation, 7-inch (17.8-cm) diameter, were attached to a rotary grinder fitted with a 7-inch (17.8-cm) ribbed disc pad face plate (80514 EXTRA HARD RED obtained from 3M Company, St. Paul, Minn.). The grinder was then activated and urged against an end face of a 0.75 in×0.75 in (1.9 cm×1.9 cm) pre-weighed 304 stainless steel bar under a load of 12 lbs (5.5 kg). The resulting rotational speed of the grinder under this load and against this workpiece was 5000 rpm. The workpiece was abraded under these conditions for a total of twenty-five (25) 12-second grinding intervals (passes). Following each 12-second interval, the workpiece was allowed to cool to room temperature and weighed to determine the cut of the abrasive operation.

Test results were reported as the total cut (average of at least three abrasive discs) and cut expressed as a percent of a control discs (i.e., Percent of Control) which were made identically to the test discs except that the experimental abrasive grain was replaced with 3M CERAMIC ABRASIVE GRAIN 321, commercially-available from 3M, Saint Paul, Minn.

TABLE 2

| EXAMPLE | $Fe_2O_3$ SEED, weight percent | $Al_2O_3$ SEED, weight percent | MgO, weight percent | $Na_2O$, weight percent | $Li_2O$, weight percent | $K_2O$, weight percent |
| --- | --- | --- | --- | --- | --- | --- |
| Comparative Example A | 1.50 | 0 | 0 | 0 | 0 | 0 |
| Comparative Example B | 1.50 | 0 | 2 | 0 | 0 | 0 |
| 1 | 1.50 | 0 | 2 | 0.075 | 0 | 0 |
| 2 | 1.50 | 0 | 2 | 0.15 | 0 | 0 |
| 3 | 1.50 | 0 | 2 | 0.225 | 0 | 0 |
| 4 | 1.50 | 0 | 2 | 0 | 0.04 | 0 |
| 5 | 1.50 | 0 | 2 | 0 | 0.08 | 0 |
| 6 | 1.50 | 0 | 2 | 0 | 0.12 | 0 |
| 7 | 1.50 | 0 | 2 | 0 | 0 | 0.113 |
| 8 | 1.50 | 0 | 2 | 0 | 0 | 0.225 |
| 9 | 1.50 | 0 | 2 | 0 | 0 | 0.338 |
| Comparative Example C | 0 | 0 | 0 | 0 | 0 | 0 |
| Comparative Example D | 0 | 0 | 0 | 0.15 | 0 | 0 |
| Comparative Example E | 0 | 0 | 2 | 0.15 | 0 | 0 |
| Comparative Example F | 0 | 0 | 2 | 0 | 0 | 0 |
| 10 | 0 | 3.80 | 0 | 0 | 0 | 0 |
| 11 | 0 | 3.80 | 2 | 0.15 | 0 | 0 |
| 12 | 0 | 3.80 | 2 | 0 | 0.08 | 0 |
| 13 | 0 | 3.80 | 2 | 0 | 0 | 0.225 |
| 14 | 0 | 3.80 | 2 | 0 | 0 | 0 |
| 15 | 1.50 | 0 | 0 | 0.15 | 0 | 0 |
| 16 | 1.50 | 0 | 0.5 | 0.15 | 0 | 0 |
| 17 | 1.50 | 0 | 1 | 0.15 | 0 | 0 |

TABLE 2-continued

| EXAMPLE | Fe$_2$O$_3$ SEED, weight percent | Al$_2$O$_3$ SEED, weight percent | MgO, weight percent | Na$_2$O, weight percent | Li$_2$O, weight percent | K$_2$O, weight percent |
|---|---|---|---|---|---|---|
| 18 | 1.50 | 0 | 2 | 0.15 | 0 | 0 |
| 19 | 1.50 | 0 | 3 | 0.15 | 0 | 0 |
| 20 | 1.50 | 0 | 5 | 0.15 | 0 | 0 |
| 21 | 1.50 | 0 | 2 | 0.05 | 0.0267 | 0.075 |
| 22 | 1.50 | 0 | 2 | 0.03 | 0 | 0 |
| 23 | 1.50 | 0 | 2 | 0.06 | 0 | 0 |
| 24 | 1.50 | 0 | 2 | 0.3 | 0 | 0 |
| 24 | 1.50 | 0 | 2 | 0.6 | 0 | 0 |

TABLE 3

| EXAMPLE | DENSITY, g/cm$^3$ | HARDNESS, gigapascals | SS GRINDING, grams | PERCENT OF CONTROL |
|---|---|---|---|---|
| Comparative Example A | 3.913 | 22.0 | 228 | 71 |
| Comparative Example B | 3.859 | 22.1 | 270 | 84 |
| 1 | 3.854 | NM | 319 | 99 |
| 2 | 3.86 | 21.1 | 321 | 100 |
| 3 | 3.855 | NM | 319 | 99 |
| 4 | 3.866 | NM | 327 | 102 |
| 5 | 3.866 | 21.8 | 334 | 104 |
| 6 | 3.867 | NM | 340 | 106 |
| 7 | 3.828 | NM | 329 | 102 |
| 8 | 3.825 | 21.7 | 327 | 102 |
| 9 | 3.822 | NM | 325 | 101 |
| Comparative Example C | 3.376 | 13.3 | 118 | 42 |
| Comparative Example D | 3.367 | 13 | 63 | 22 |
| Comparative Example E | 3.465 | 16.2 | 247 | 87 |
| Comparative Example F | 3.532 | 16.5 | 265 | 94 |
| 10 | 3.948 | 23.6 | 308 | 109 |
| 11 | 3.918 | 24.8 | 385 | 136 |
| 12 | 3.912 | 25.3 | 382 | 135 |
| 13 | 3.916 | 25 | 362 | 128 |
| 14 | 3.92 | 24.8 | 311 | 110 |
| 15 | 3.928 | 20.8 | 154 | 53 |
| 16 | 3.923 | 21 | 275 | 95 |
| 17 | 3.916 | 23.8 | 290 | 101 |
| 18 | 3.904 | NM | 294 | 102 |
| 19 | 3.884 | NM | 308 | 107 |
| 20 | 3.836 | 22.9 | 303 | 105 |
| 21 | 3.897 | 23.1 | 277 | 96 |
| 22 | 3.898 | NM | 309 | 107 |
| 23 | 3.909 | NM | 314 | 109 |
| 24 | 3.9 | NM | 291 | 101 |
| 24 | 3.858 | 23.3 | 264 | 92 |

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. Abrasive particles, wherein the abrasive particles comprise the components:
    a) 0.50 to 5.00 weight percent of seed particles for alpha-alumina formation selected from the group consisting of alpha-Fe$_2$O$_3$ seed particles, alpha-Al$_2$O$_3$ seed particles, and combinations thereof;
    b) 0.50 to 5.00 weight percent of MgO;
    c) 0.02 to 0.40 weight percent of Li$_2$O or a molar equivalent amount of at least one alkali metal oxide selected from the group consisting of: Na$_2$O; K$_2$O; combinations of Na$_2$O and Li$_2$O; combinations of K$_2$O and Li$_2$O; combinations of Na$_2$O and K$_2$O; and combinations of Li$_2$O, Na$_2$O, and K$_2$O; and
    d) 91.08 to 99.48 weight percent of Al$_2$O$_3$,
wherein component c) comprises 0.05 to 1.00 weight percent of K$_2$O.

2. Abrasive particles according to claim 1, wherein the abrasive particles consist of components a), b), c), and d).

3. Abrasive particles according to claim 1, wherein the abrasive particles comprise an alpha-alumina crystalline phase and from 0.25 to 20 percent by weight of a beta-alumina crystalline phase.

4. Abrasive particles according to claim 1, wherein the abrasive particles comprise less than 10 percent by weight of magnetoplumbite crystalline phases.

5. A method of abrading a workpiece, the method comprising:
    frictionally contacting abrasive particles according to claim 1 with a surface of the workpiece, and
    moving at least one of the abrasive particles and the surface of the workpiece relative to the other to abrade at least a portion of the surface of the workpiece.

6. An abrasive article comprising abrasive particles according to claim 1 retained in a binder material.

7. An abrasive article according to claim 6, wherein the binder material is disposed on a substrate.

8. An abrasive article according to claim 7, wherein the abrasive article comprises an abrasive layer comprising the abrasive particles and the binder material secured to a major surface of a backing, and wherein the abrasive layer comprises a make coat and a size coat.

9. An abrasive article according to claim 7, wherein the abrasive article comprises an abrasive layer comprising the abrasive particles and the binder material secured to a major surface of a backing, and wherein the abrasive layer comprises a plurality of shaped abrasive composites.

10. An abrasive article according to claim 7, wherein the substrate comprises a lofty open nonwoven fiber web.

11. An abrasive article according to claim 6, wherein the abrasive article comprises a bonded abrasive article.

12. A method of making abrasive particles, the method comprising:
    i) providing a dispersion comprising:
        an alpha-alumina precursor;
        alkali metal cations selected from the group consisting of Li$^+$, Na$^+$, K$^+$, and combinations thereof;
        magnesium oxide or a precursor thereof; and
        seed particles selected from the group consisting of alpha-Fe$_2$O$_3$ seed particles and alpha-Al$_2$O$_3$ seed particles, or a precursor thereof, wherein the seed particles facilitate conversion of the alumina precursor material to alpha-alumina upon sintering;
ii) converting the dispersion to abrasive precursor particles; and
iii) sintering the abrasive precursor particles to provide the abrasive particles, wherein the abrasive particles comprise the components:
  a) 0.50 to 5.00 weight percent of the seed particles;
  b) 0.50 to 5.00 weight percent of MgO;
  c) 0.02 to 0.40 weight percent of $Li_2O$ or a molar equivalent amount of at least one alkali metal oxide selected from the group consisting of: $Na_2O$; $K_2O$; combinations of $Na_2O$ and $Li_2O$; combinations of $K_2O$ and $Li_2O$; combinations of $Na_2O$ and $K_2O$; and combinations of $Li_2O$, $Na_2O$, and $K_2O$; and
  d) 91.08 to 99.48 weight percent of $Al_2O_3$,
wherein component c) comprises 0.05 to 1.00 weight percent of $K_2O$.

13. A method according to claim 12, wherein the abrasive particles consist of components a), b), c), and d).

14. A method according to claim 12, wherein the abrasive particles comprise an alpha-alumina crystalline phase and from 0.25 to 20 percent by weight of a beta-alumina crystalline phase, based on the total weight of the alpha-alumina crystalline phase and the beta-alumina crystalline phase combined.

15. A method according to claim 12, wherein each of the abrasive particles comprises less than 10 percent by weight of magnetoplumbite crystalline phases.

16. A method according to claim 12, wherein said converting the dispersion to the abrasive precursor particles comprises a drying step followed by a calcining step.

* * * * *